Patented Jan. 12, 1943

2,307,782

UNITED STATES PATENT OFFICE 2,370,782

ANTHRAQUINONE COMPOUND

James G. McNally and Joseph B. Dickey, Rochester, N. Y., and Arzy R. Gray, Kingsport, Tenn., assignors to Eastman Kodak Company, Rochester, N. Y., a corporation of New Jersey No Drawing. Application February 11, 1939, Serial No. 255,956

2 Claims. (Cl. 260—379)

This invention relates to anthraquinone compounds. More particularly it relates to anthraquinone compounds having as a substituent of the anthraquinone nucleus an aminoacetal group and their application for the dyeing or coloration of organic derivatives of cellulose. The invention includes the new anthraquinone compounds, the process for their preparation, the process of dyeing or coloring therewith and materials made of or containing an organic derivative of cellulose colored with said compounds.

Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

It is an object of our invention to provide a new class of anthraquinone compounds.

A further object of our invention is to provide a process for the dyeing or coloration of organic derivatives of cellulose.

A specific object is to provide a process for the dyeing or coloring of materials made of or containing an organic derivative of cellulose wherein the dye is applied directly from an aqueous suspension.

Another object is to provide material made of or containing an organic derivative of cellulose colored with the anthraquinone dye compounds of our invention.

A still further object is to provide a suitable process for the manufacture of the anthraquinone compounds of our invention.

The anthraquinone compounds, by means of which the above named objects are accomplished or made possible, are characterized in that they contain in an alpha position an aminoacetal group.

While our invention relates generally to anthraquinone compounds characterized in the manner just described, it relates more particularly to anthraquinone compounds having the general formula:

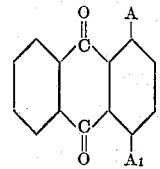

wherein A represents an aminoacetal group and wherein $A_1$ may be the same as A and in addition may be a member selected from the group consisting of a hydroxy group, an amino group, an alkylamino group, an arylamino group, an aralkylamino group, a hydroarylamino group and a heterocyclicamino group. Compounds of the above general formula wherein $A_1$ is an alkylamino group are particularly of value. The term "an alkylamino group," as will be more fully seen hereinafter, includes not only unsubstituted alkylamino groups but also substituted alkylamino groups such as a hydroxyalkylamino group or an alkoxyalkylamino group, for example.

It is to be clearly understood that while the compounds having the general formula given above are generally advantageous our invention is not limited thereto. The anthraquinone compounds of our invention may also be substituted in the 5 and 8 positions with substituents, for example, such as are represented by $A_1$. Similarly the anthraquinone compounds of our invention may be substituted in a β-position with a substituent such as a halogen atom, a hydroxyl group, an alkoxy group or a carboxy group or salt thereof. Further, our invention includes compounds wherein A₁ is, for example, hydrogen, an alkoxy group, an

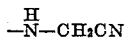

group, an

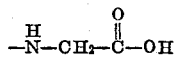

group, an

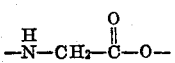

alkali metal group or an

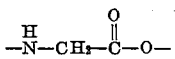

alkyl group.

The anthraquinone compounds of our invention, generally speaking, can be prepared in a satisfactory and advantageous way by condensing a leuco anthraquinone with an aminoacetal. In order that our invention may be clearly understood, a number of aminoacetals illustrative of those which may be employed in the production of the anthraquinone compounds of our invention are listed hereinafter. As illustrative of an aminoacetal may be mentioned

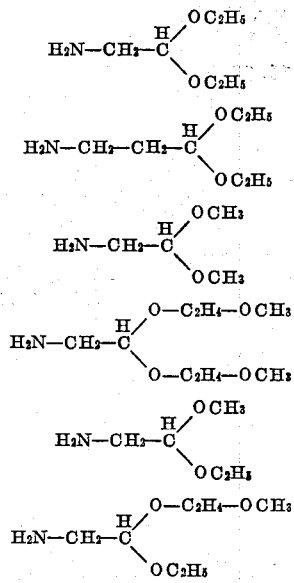

and

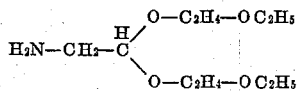

Leuco anthraquinones suitable for use are those containing an alpha negative substituent capable of being replaced by an amino group by the action of an amine. Negative substituents capable of such replacement include, for example, the hydroxy group, the nitro group, a halogen atom, such as chlorine or bromine, and an alkoxy group, such as methoxy or ethoxy. One or more of such negative substituents may be present. These will be replaced in whole or in part depending on the conditions under which the condensation reaction is conducted.

Examples of leuco anthraquinone compounds that may be employed are leuco quinizarin, leuco 1-hydroxy-4-aminoanthraquinone, leuco 1-methoxy-4-aminoanthraquinone, leuco 1-methoxy-4-aminoanthraquinone, leuco 1-chloro (or bromo) anthraquinone and leuco 1-hydroxy-4-chloroanthraquinone. 1-hydroxy-4-nitroanthraquinone and 1-nitroanthraquinone, for example, may likewise be condensed with an aminoacetal to form compounds included within the scope of our invention.

Ordinarily the aminoacetal group present in the anthraquinone compound of our invention will be represented by the general formula:

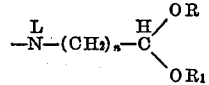

wherein L represents a member selected from the group consisting of hydrogen, an unsubstituted alkyl group and a hydroxyalkyl group, $n$ represents 1, 2, 3 or 4 and R and R₁ each represents a member selected from the group consisting of an unsubstituted alkyl group and an alkoxyalkyl group. Anthraquinone compounds wherein L has the above meaning may be prepared by first preparing an anthraquinone compound wherein L is hydrogen and then treating said compound to replace the hydrogen atom by an unsubstituted alkyl group or a hydroxyalkyl group. Said alkyl or hydroxyalkyl group may be introduced by known methods for the introduction of these groups.

The exact method employed for the preparation of the compounds of our invention is dependent upon the compound to be prepared. Where the only substituent desired to be introduced on the anthraquinone nucleus is an aminoacetal group, the anthraquinone compound may be prepared by condensing a leuco anthraquinone with an aminoacetal. More than one aminoacetal group may be present in the anthraquinone nucleus and in such case they may be the same or different. Where two different aminoacetal groups are to be present the condensation may be carried out with both aminoacetals present or stepwise. It will be understood that where more than one aminoacetal group is to be present the leuco anthraquinone employed in the condensation reaction should contain at least as many replaceable substituents as aminoacetal groups desired to be introduced.

Where the desired anthraquinone compound is to contain both an aminoacetal group and another substituent, an amine radical, for example, the condensation reaction may similarly be carried out with both amines present or stepwise. Where this latter procedure is employed, the leuco anthraquinone may first be caused to react with one molecular equivalent weight of the aminoacetal and then with the desired amine or the leuco anthraquinone may first be caused to react with one molecular equivalent weight of the amine, other than the aminoacetal, and then with the desired aminoacetal.

Anthraquinone compounds containing a substituent other than an amino substituent in addition to the required aminoacetal group may be directly obtained in some instances by proper selection of the anthraquinone starting material. To illustrate, an anthraquinone compound containing an aminoacetal group in the 1-position and a hydroxy group in the 4-position can be obtained by reacting leuco quinizarin with just the proper amount of the aminoacetal required to replace one of the hydroxy groups.

The condensation reactions referred to may be carried out in water, in an alcohol such as ethanol, propanol or butanol or other inert solvent medium such as pyridine. The resulting leuco dye compound may be oxidized with air or other suitable oxidizing agent such as sodium perborate or sodium chlorate, for example, to obtain the desired dye compound.

The following examples illustrate the preparation of the anthraquinone dye compounds of our invention.

*Example 1*

13.3 grams of aninoacetal,

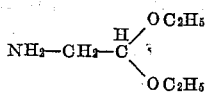

and 24 grams of leuco quinizarin are heated in 250 cc. of pyridine at 100° C. for ten hours following which the leuco dye compound formed is oxidized with air. The dye compound resulting may be recovered by distilling off the pyridine and has the probable formula:

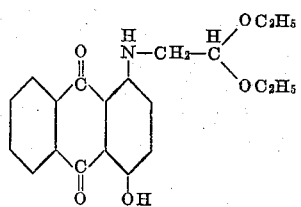

The dye compound obtained dyes cellulose acetate silk purple shades from an aqueous suspension.

*Example 2*

22 grams of aminodimethylacetal,

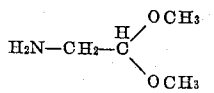

24 grams of leuco quinizarin and 300 cc. of ethanol are charged into an autoclave and heated at 90–95° C. for twenty hours. The resulting leuco dye compound is oxidized by treatment with alkaline sodium perborate. The dye compound resulting may be recovered by distilling off the solvent and has the probable formula:

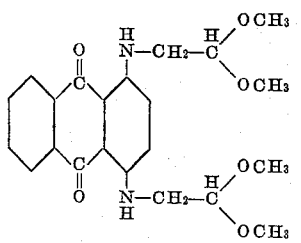

The dye compound obtained colors cellulose acetate silk a blue shade.

*Example 3*

20 grams of amino-di-β-methoxyacetal,

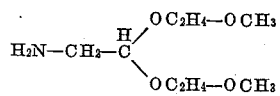

11 grams of tetrahydrofurfurylamine, 24 grams of leuco quinizarin and 250 cc. of ethanol are charged into an autoclave and heated for 20 hours at 90–95° C. The reaction mixture is worked up as described in Example 2. The dye compound obtained has the probable formula:

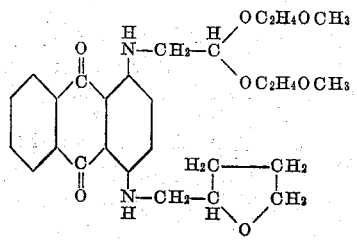

and dyes cellulose acetate silk a blue shade.

*Example 4*

13.3 grams of aminoacetal, 24 grams of leuco quinizarin, 8 grams of piperidine, 25.8 grams of leuco-1,4,5-trihydroxyanthraquinone and 250 cc. of ethanol are charged into an autoclave and heated at 90–95° C. for 20 hours. The reaction mixture resulting is worked up as described in Example 2. The dye compound obtained has the probable formula:

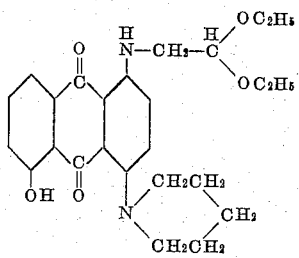

and dyes cellulose acetate silk a blue shade.

*Example 5*

27.4 grams of leuco-1,4,5,8-tetrahydroxyanthraquinone, 19.3 grams of amino-di-β-methoxyacetal, 3.5 grams of methylamine and 250 cc. of ethanol are charged into an autoclave and treated as described in Example 2. The dye compound obtained has the probable formula:

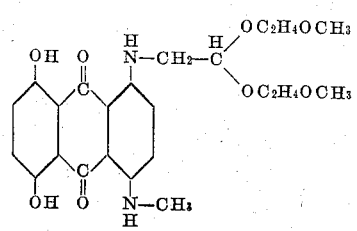

and dyes cellulose acetate silk blue.

*Example 6*

13.3 grams of aminoacetal, 24 grams of leucoquinizarin, 12 grams of p-phenylenediamine and 250 cc. of pyridine are heated in an autoclave at 90–100° C. for twenty hours. The leuco dye compound resulting is then oxidized with air and the desired dye compound formed is recovered by distilling off the pyridine. The dye compound obtained has the probable formula:

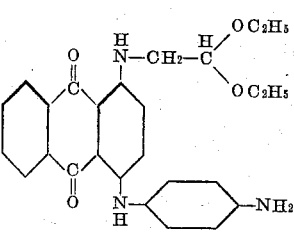

and dyes cellulose acetate silk a blue shade.

Example 7

10 grams of the dye obtained in Example 6 are boiled with 25 cc. of ethylene chlorohydrin and 10 grams of anhydrous sodium acetate for one hour following which the reaction mixture is poured into water. The precipitated dye compound is recovered by filtration, washed with water and dried. A mixture of dyes having the probable formulae:

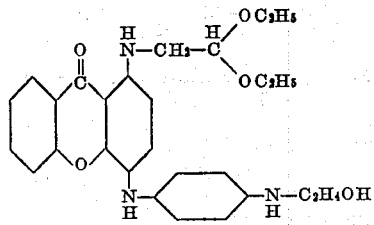

and

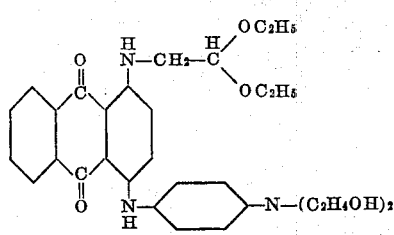

is obtained. This dye mixture dyes cellulose acetate silk greenish blue shades from an aqueous suspension. In accordance with our invention, it will be understood that another chlorohydrin such as glyceryl chlorohydrin or trimethylene chlorohydrin, for example, may be used in place of ethylene chlorohydrin to obtain generally similar dye compounds.

Example 8

19.3 grams of amino-di-β-methoxyacetal, 24 grams of leuco quinizarin and 10 grams of aniline are heated in 250 cc. of ethanol in an autoclave at 90–100° C. for twenty hours. The reaction product is worked up as described in Example 2. The dye compound obtained has the probable formula:

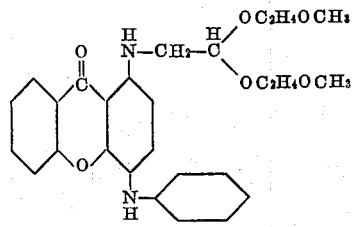

and dyes cellulose acetate silk a blue shade.

By the substitution of an equivalent amount of aminodimethylacetal for amino-di-β-methoxyacetal and an equivalent weight of p-anisidine for aniline, in the above example, the dye compound having the probable formula:

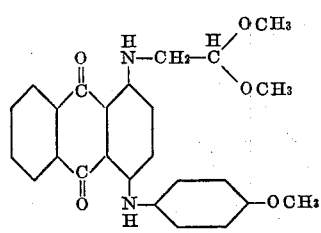

can be prepared.

Example 9

13.3 grams of aminoacetal, 24 grams of leuco quinizarin, 11 grams of cyclohexylamine and 250 cc. of ethanol are heated in an autoclave at 90–100° C. for twenty hours and the resulting mixture is worked up as described in Example 2. The dye compound obtained has the probable formula:

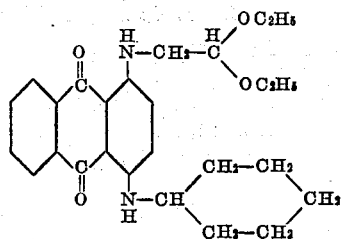

and dyes cellulose acetate silk a blue shade.

Example 10

10.5 grams of aminodimethylacetal, 24 grams of leuco quinizarin, 250 cc. of pyridine and 7 grams of ethanolamine are heated together in a suitable container at 100–120° C. for ten hours following which the resulting leuco dye compound formed is oxidized with air. The desired dye compound is recovered by distilling off the pyridine, has the probable formula:

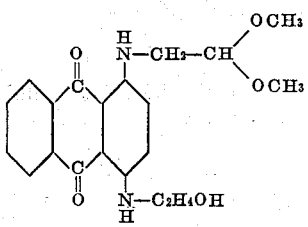

and dyes cellulose acetate silk a blue shade.

Example 11

25.3 grams of 1-amino-4-methoxy anthraquinone are heated in 300 cc. of ethanol with 10.5 grams of aminodimethylacetal until no further color change takes place. The dye compound is worked up as described in Example 2 and has the probable formula:

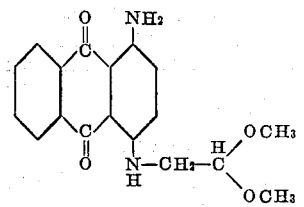

This dye compound dyes cellulose acetate silk purple shades from an aqueous suspension.

It will be understood that the foregoing examples are intended to be illustrative and not limitative of our invention. To illustrate, aminoacetals, other than those specifically employed in the examples, may be used. Similarly, amines other than aminoacetals, which may be employed, include, for example, ethylamine, propylamine, butylamine, propanolamine, o-, m-, p-toluidine, benzylamine, phenylethylamine, cyclobutylamine, furfurylamine, 2-aminopyridine and β-furylethylamine.

In order that our invention may be clearly understood, it is here noted that aminoacetals may be prepared as described in Journal American Chemical Society, vol. 51, page 3612 (1929). Aminoacetals, which may be employed in the preparation of the compounds of our invention, may also be prepared by treating a halogenated acetal with sodium cyanide or cuprous cyanide, for example, to give the nitrile compound from which the aminoacetal may be obtained by reduction with hydrogen in the presence of a catalyst such as nickel.

In order that the application of the compounds of our invention may be clearly understood, their application for the direct dyeing or coloration of materials made of or containing an organic derivative of cellulose, and more particularly cellulose acetate silk, is described hereinafter. The anthraquinone dye compounds of our invention are, for the most part, relatively insoluble in water and, accordingly, they are ordinarily applied to the material in the form of an aqueous suspension which can be prepared by grinding the dye to a paste in the presence of a sulfonated oil, soap or other suitable dispersing agent and dispersing the resulting paste in water. The dye compounds of our invention, which are water soluble, do not, of course, require the use of a dispersing or solubilizing agent but may be applied to the organic derivative of cellulose material from their aqueous solutions. Dyeing operations can, with advantage, be conducted at a temperature of 75–85° C. but any suitable temperature may be used. In accordance with the usual dyeing practice, the material to be dyed will ordinarily be added to the aqueous dyebath at a temperature lower than that at which the main portion of the dyeing is to be effected, a temperature approximating 45–55° C., for example, following which the temperature of the dyebath will be raised to that selected for carrying out the dyeing operation. The temperature at which the dyeing is conducted varies somewhat depending, for example, on the particular organic derivative of cellulose material undergoing coloration.

The amount of dispersing agent employed may be varied over wide limits. Amounts approximating 10 to 200% by weight on the dye may be employed, for example. These amounts are not to be taken as limits as greater or lesser amounts can be used. To illustrate, if the dye is ground to a sufficiently fine powder, dyeing can be satisfactorily carried out without the aid of a dispersing agent. Generally speaking, however, the use of a dispersing agent is desirable.

It will be understood that the anthraquinone compounds of our invention may be applied to the material to be colored in any suitable manner. Coloration may be effected, for example, by dyeing, printing, or stenciling. Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

The following example illustrates how dyeing may be carried out in accordance with our invention. Quantities are expressed in parts by weight.

*Example A*

2 parts of the dye compound of Example 2 are finely ground with a dispersing agent such as soap or oleyl glyceryl sulfate and the resulting paste is dispersed in 1000 parts of water. The dispersion thus prepared is heated to a temperature approximating 45–55° C. and 100 parts of cellulose acetate silk in the form of yarn or fabric, for example, are added to the dyebath after which the temperature is gradually raised to 75–85° C. and the silk worked for several hours at this latter temperature. Sodium chloride may be added, as desired, during the dyeing operation to promote exhaustion of the dyebath. Upon completion of the dyeing operation, the cellulose acetate silk is removed, washed with soap, rinsed and dried. The cellulose acetate silk is colored a blue shade of good fastness to light. While our invention has been illustrated in connection with the dyeing of cellulose acetate silk, it will be understood that dyeing operations can be carried out in a manner similar to that described above by the substitution of another organic derivative of cellulose material such as those mentioned hereinbefore for cellulose acetate silk or by employing dye compounds other than that employed in the example or by substitution of both the material being dyed and the dye compound of the example.

We claim:

1. An unsulfonated anthraquinone compound having the formula:

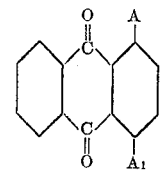

wherein A represents an aminoacetal radical joined to the anthraquinone nucleus through the nitrogen atom of its amino group and $A_1$ represents an alkylamino group.

2. An unsulfonated anthraquinone compound having the formula:

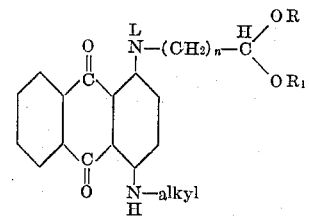

wherein L represents a member selected from the group consisting of hydrogen, an unsubstituted alkyl group and a hydroxyalkyl group, $n$ represents a member selected from the group consisting of 1, 2, 3 and 4, and R and $R_1$ each represents a member selected from the group consisting of an unsubstituted alkyl group and an alkoxy-alkyl group.

JAMES G. McNALLY.
JOSEPH B. DICKEY.
ARZY R. GRAY.